United States Patent [19]

Balzer et al.

[11] 4,345,412
[45] Aug. 24, 1982

[54] CUP LIDDING APPARATUS AND LEAKPROOF CUP

[76] Inventors: Winton E. Balzer, 963 Central Ave., Needham, Mass. 02102; Kenneth M. Knobel, 37 Percy Rd., Lexington, Mass. 02173

[21] Appl. No.: 159,294

[22] Filed: Jun. 13, 1980

[51] Int. Cl.³ .................... B67B 3/04; B65B 51/14; B65B 7/28
[52] U.S. Cl. ........................... 53/297; 53/298; 53/373
[58] Field of Search ............... 53/298, 297, 296, 329, 53/373, 141, 133

[56] References Cited

U.S. PATENT DOCUMENTS

| | | | |
|---|---|---|---|
| 3,286,437 | 11/1966 | Cole | 53/296 |
| 3,345,797 | 10/1967 | Von Stoeser | 53/297 X |
| 3,703,066 | 11/1972 | Marion et al. | 53/296 |
| 3,716,963 | 2/1973 | Amberg | 53/329 X |
| 4,050,971 | 9/1977 | Verkins et al. | 53/296 X |
| 4,078,360 | 3/1978 | Balzer et al. | 53/296 X |
| 4,092,817 | 6/1978 | Rist | 53/298 |
| 4,134,248 | 1/1979 | Freeman | 53/329 X |
| 4,184,310 | 1/1980 | Shelby | 53/297 X |
| 4,226,072 | 10/1980 | Balzer et al. | 53/298 |

Primary Examiner—Horace M. Culver
Attorney, Agent, or Firm—Morse, Altman, Oates & Dacey

[57] ABSTRACT

Apparatus is provided for automatically applying and heat-sealing a lid of thermoplastic film to the top of a cup. The film is supplied in a roll and the leading end is fed into a position between the top of the cup and a heat-sealing head. When the apparatus is run through an operating cycle, the cup and the head are brought together to seal a section of film to the rim of the cup and sever the section from the roll. The head is characterized by an annular heated cushion and a slitting device to from a slit in the center of the lid which enhances the seal, particularly if the cup contains a hot liquid. In an alternative arrangement, the slitting mechanism is located along the path of the film and the center of the head is constructed to prevent exposing the center of the lid to high temperature. A leakproof cup is provided in which a disposable cup is closed by a heat-sealed section of film that is relatively tight in the vicinity of the rim and relatively slack in the center in which a short, straight slit is formed.

4 Claims, 9 Drawing Figures

CUP LIDDING APPARATUS AND LEAKPROOF CUP

BACKGROUND OF THE INVENTION

1. Field of the Invention

This invention relates generally to packaging equipment and packaging products and more particularly is directed towards a new and improved apparatus for making and applying to a disposable drinking cup a lid of heat sealable film material from a roll of such material. This invention also relates to an improved disposable drinking cup and lid combination in which the lid is in the form of a film of thermoplastic material heat-sealed to the cup rim.

2. Description of the Prior Art

In our U.S. Pat. No. 4,078,360 and in our co-pending application Ser. No. 966,876, filed Dec. 6, 1978, now U.S. Pat. No. 4,226,072 there is disclosed an apparatus for lidding a disposable drinking cup with a film of thermoplastic sheet material. The apparatus includes a cup support adapted to raise a cup placed thereon into contact with the leading section of a thermoplastic film held by reciprocating gripping jaws. Mounted above the film along the axis of movement of the cup holder is a heated sealing head which comes down against the top of the film to press the film and seal it to the rim of the cup. Upon completion of this sealing operation, the cup drops down, the head moves up and the jaws retract to grip and draw out a fresh section of film in preparation for the next lidding operation. The apparatus is controlled by means of a pneumatic circuit provided with logic modules and control switches in a cooperative arrangement.

It is an object of the present invention to provide improvements in cup lidding apparatus of the sort disclosed in our prior patent and co-pending application. It is a more specific object of this invention to provide an improved sealed container comprised of a cup and lid which is substantially leakproof and is especially adapted for use with hot liquid contents. A further object of this invention is to provide a new and improved heat-sealing head adapted to seal a section of film against the cup lid in an improved manner so as to substantially eliminate any leakage, especially where the cup contains a hot liquid.

SUMMARY OF THE INVENTION

This invention features an apparatus for applying a film of thermoplastic sheet material as a lid onto a disposable drinking cup, comprising a cup holder adapted to raise and lower the cup to and from a section of thermoplastic film held by a film advance mechanism and a reciprocating heat-sealing head adapted to move in and out of heat-sealing engagement with the film that has been drawn over the top of a cup to seal the film onto the cup rim as a lid. The heat-sealing head includes an annular heated pad adapted to apply heat to the film only in the area adjacent the rim of the cup while the center portion of the film remains unheated. A slitting mechanism, located either in the center of the heat-sealing head or elsewhere along the path of travel of the film, automatically forms a short, straight or cross-shaped slit in the center of the lid which has been found to be highly effective in improving the seal between the cup and the film, particularly where the cup contains a hot liquid.

This invention also features a cup having a film lid heat-sealed thereto about the rim thereof and formed with a medial slit therein. The area of the film near the rim is relatively tight, while the center portion is relatively slack.

DETAILED DESCRIPTION OF THE PREFERRED EMBODIMENTS

Figure 1:
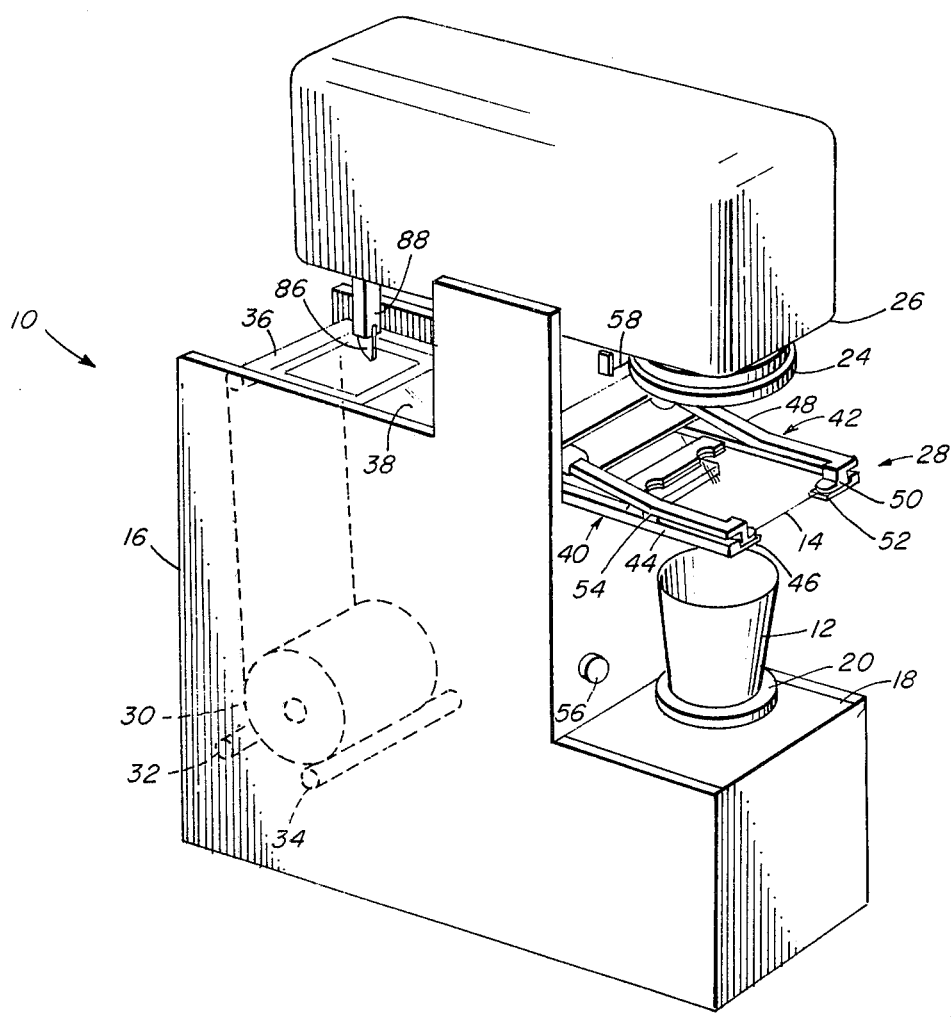
FIG. 1 is a view in perspective of a cup lidding apparatus made according to the invention.

Referring now to the drawings and to FIG. 1 in particular, the reference character 10 generally indicates an apparatus for automatically applying to a disposable drinking cup 12, or similar container, a film lid 14 that is somewhat oversized to accommodate different cup sizes. The apparatus 10 is generally organized about a housing 16, preferably of a relatively narrow front profile to minimize the frontal space required on a food counter which normally is quite crowded. The housing includes a lower front shelf 18 on which is disposed a cup holder 20 adapted to reciprocate vertically under the action of a pneumatic piston and cylinder, more fully disclosed in our prior U.S. Pat. No. 4,078,360 and co-pending application Ser. No. 966,876, now U.S. Pat. No. 4,226,072 filed Dec. 6, 1978, and mounted within the housing below the shelf 18.

In practice the piston of the cylinder has a relatively long and variable stroke and, when actuated, provides a continuous upward lifting pressure so that cups in a variety of different heights will all be raised sufficiently to bring their rims into contact with the film. Located directly above the cup support 20 is a heat-sealing head 24 with a relatively wide flat lower face adapted to reciprocate vertically along the same axis as the cup support 20 in order to heat-seal the film 14 onto the rim of the cup 12 when the cup is in a raised position. The heat-sealing head 24 is reciprocated by means of a pneumatic piston and cylinder mounted to an upper overhanging shelf 26 near the top of the housing and more fully disclosed in the above patent and application.

Disposed between the heat-sealing head and the cup support is a film advance mechanism or carriage 28 adapted to reciprocate horizontally through a vertical front wall of the housing in order to draw out a fesh section of lidding film providing in strip form and fed from a roll 30 of the film. The roll is mounted within the housing and is supported by rollers 32, 34 forming a cradle with the film being drawn from the roll upwardly around an abutment 36 and horizontally forward along a guideway platen 38. The leading end of the film is then engaged by the film advance mechanism 28 which reciprocates horizontally in and out of the housing on each cycle of operation of the machine, drawing each time a fresh section of film and holding it in position between the cup 12 and heat-sealing head 24 where it can be sealed onto the cup rim and severed from the rest of the film. The film advance mechanism then retracts, engages the leading edge of the film and draws out a new section of film into lidding position.

The film advance mechanism 28 includes a relatively fixed lower jaw assembly 40 and a relatively movable upper jaw assembly 42. The lower jaw assembly 40 includes a pair of forwardly extending, spaced parallel arms 44 each with a flat, L-shaped inwardly projecting end portion 46 which supports and engages the lower face and opposing leading edge of the film. The upper face of the film is gripped by the movable upper jaw assembly 42 comprised of a pair of parallel rocker arms 48 extending directly above the arms of the lower jaw assembly 40 and terminating in L-shaped inwardly projecting outer end portions 50, each end provided with a frictional pad 52. The rocker arms 48 are pivoted to the lower jaw assembly at pivot points 54. The pad 52 may be of rubber or similar material adapted to grip firmly the top corners of the leading edge of the film, clamping the film tightly against the lower jaw assembly 40 and defining with it a jaw mechanism which opens and closes in predetermined timed sequence upon each operating cycle of the machine. A film stabilizer 55 is mounted at the forward portion of the film advance mechanism and is formed with a pair of cutaway portions 57 and 59 to accommodate the ends of the gripping jaws when they retract.

By gripping the leading edge of the film inwardly towards the center rather than at the corners, a more reliable operation is achieved. Since the film is very thin and light weight, it has a tendency to curl, particularly at the corners. If the corners were to curl during a cycle of the machine, the jaws may not grip the film on one side and thereby cause the film to be pulled at one side only and distorting the film. This possibility is avoided by gripping the film in the manner shown in FIGS. 1 and 2.

As shown, the jaws are in the extended and closed position, holding the leading edge of the film extended and taut over the cup 12 in position prior to an operating cycle. The machine is cycled by the operator placing the cup 14 on the cup support 20 and pushing an actuating button 56. The machine will then automatically start a cycle in which the cup support 20 first raises the cup 12 so that the rim of the cup will come up against the lower face of the film while at the same time the heat-sealing head 24 will come down against the top face of the film, applying heat and pressure to the film along the line of contact with the cup rim, causing the film to heat-seal against the rim of the cup. In the same stroke, a heated wire 58 located rearwardly of the sealing head 24 and movable with it, severs that section of film which has been heat-sealed to the cup from the strip of film. When the operation has been completed, the head 24 retracts, the film advance mechanism 28 opens its jaws by pivoting the rocker arms 48 as it retracts inwarly and the cup support 20 drops together with the now sealed cup 14.

The heat-sealing head 24, in the preferred embodiment of the invention, is comprised of an aluminum plate 60 attached by a bracket 62 to the lower end of a rod 64 connected to the piston of the pneumatic cylinder which operates the head 24. The plate 60 resiliently supports an annular heating assembly 66 comprised of an upper annular aluminum backing member 68, an annular heating element 70, an annular aluminum member 72 and a lower resilient annular pad 74. The lower working face of the heating assembly 66 is relatively wide and flat in order to accommodate cups of various widths. The center portion of the heating assembly 66 is open and the entire assembly is suspended by means of connecting pins 76 loosely fitted to the upper aluminum plate 60 and provided with compressed coil springs 78 by means of which the assembly will seat neatly against the rim of a cup coming into contact with the working face of the head. Thus, any irregularities in the position of the cup with respect to the head will be accommodated to ensure that the head comes into proper, full-line contact with the rim of the cup. The resilient lower pad 74 in the preferred embodiment typically is a relatively high temperature silicon rubber which provides the desired cushioning action on the working face and is capable of operating at high temperature without sticking to the film. The cushioning characteristics of the working face causes the film to wrap to some extent around the rim of the cup to provide a relatively wide seal when the heated head is brought into contact against the film and the cup.

Extending below the open center of the head 24 is a disc 81 comprised of a metal backing plate 83 a temperature-resistant silicon laminate working face 85. The disc is mounted by a support rod 87 and, in practice, extends below the lower face of the head by perhaps 3/16" to $\frac{1}{4}$". The function of the disc 81 is to press the center of the film down and away from the head to insulate the center of the film from the heat of the head, thereby preventing any significant shrinking of the film in the center of the lid.

Figure 2:
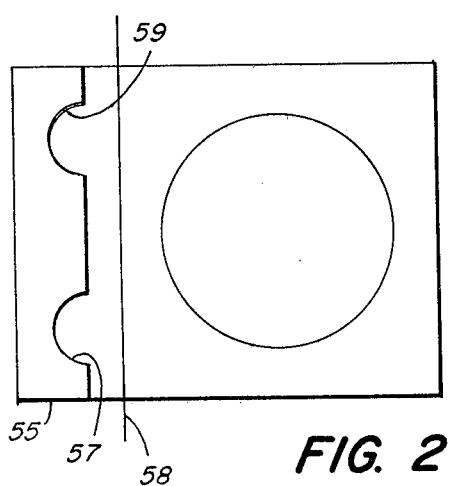
FIG. 2 is a detail top plan view of the film stabilizer and gripper portion of the apparatus.
Figure 3:
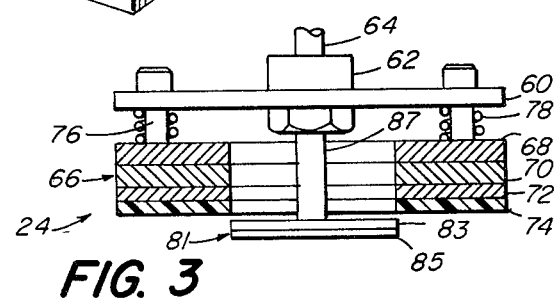
FIG. 3 is a detail sectional view in side elevation of the heat sealing head.
Figure 4:
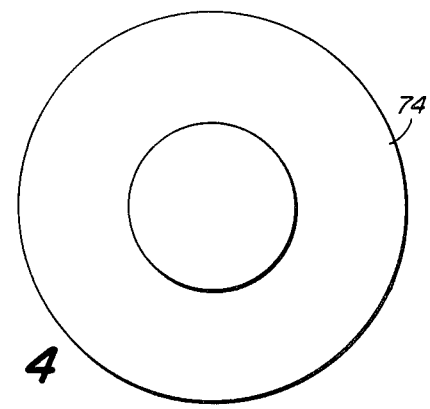
FIG. 4 is a bottom plan view thereof.

The heat-sealable film used in producing the lid tends to have a memory with the result that it has some shrink characteristics when exposed to heat. If a full circular heating pad were used to heat-seal the film onto the cup, the entire film lid would shrink to some extent when heat-sealed to the cup. The shrinkage would cause a certain lateral tension on the film, usually in one direction and sometimes causing the lid to loosen at one point or another with the result that leaks would occasionally develop in otherwise closed cups. By using an annular heating head as disclosed herein, combined with the disc 81 a much better seal is provided in that only the annular portion 80 of the film proximate to the rim of the cup is exposed to heat whereas the center portion 82 is not. As shown in FIGS. 2 and 3, the resulting sealed cup has a relatively tight section of film around the end of the cup and inwardly to some extent while the center portion of the lid, not having been exposed to heat-sealing temperatures, is in a somewhat relaxed state. Thus, any lateral tensions introduced to the film by the heat-sealing operation will be released by the slack in the center of the lid rather than to pull the film away from the cup rim. As a result, the seal between the film and the cup is uniformly tight, repeatable, and virtually eliminates leakage problems.

If the cup is to contain hot liquids it has been found that a leakage problem could develop as a result of steam or vapors from hot liquids producing a pressure problem within the container. This problem is eliminated by forming a short, straight slit 84 in the center of the lid within the slack area 82. Such a slit, which allows the pressure within the cup to be relieved, does not allow liquids to escape so that a leakproof sealed cup is maintained. It has been found in practice that a cup of hot liquid, sealed in this fashion, can be tipped upside down without any leakage whatsoever despite the presence of the slit.

The slit 84 may be produced by various means, although in practice the preferred means is to provide a slitting knife 86 along the film path, which knife 86 is mounted for reciprocation by a piston and cylinder 88 or the like and actuated by the control system of the apparatus. The knife 86 is adapted to reciprocate in and out of contact with the film at a point in the middle of the path of travel of the film. The position of the knife and the timing of its operation is such that the slit will be located in the center of the severed section of the film which forms the lid when the slit section of film advances into lidding position. The support along the film guide may be formed with an opening through which the knife 86 may pass when reciprocated or a suitable cushioning backing element may be provided. By locating the slitting knife to the rear of the machine, there is no risk of injury to the operator during normal operation.

Figure 5:
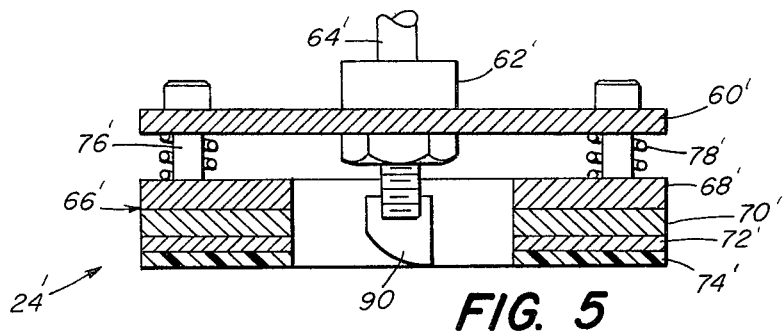
FIG. 5 is a sectional view in side elevation showing a modified heat sealing head made according to the invention.

In a modification of the invention, as shown in FIG. 5, a slitting knife 90 may be mounted within the head assembly with the cutting edge thereof extending down through the center of the opening. The cutting edge is slightly curved in the manner shown and, when the head is reciprocated down against the film, the film will be slit in the center simultaneously with the sealing of the film against the cup.

Figure 8:
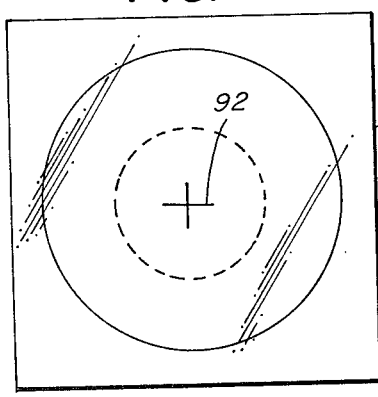
Figure 9:
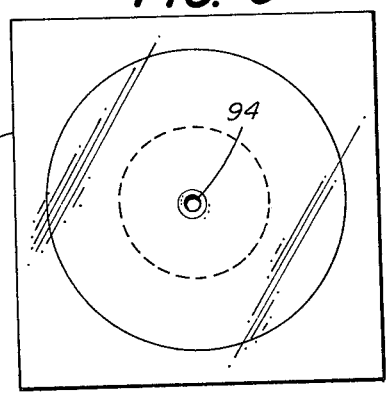

Referring now to FIG. 8 of the drawings, there is illustrated a modification of the invention, and in this embodiment a cup lid 14' is formed with a cross-shaped hole 92 instead of a straight slit. Each straight section of the hole should not exceed ¼" in length so as to maintain the desired leakproof characteristic of the lid. The cut may be made by cross-shaped slitting knife and the cross-shaped hole facilitates insertion of a drinking straw.

Figure 6:
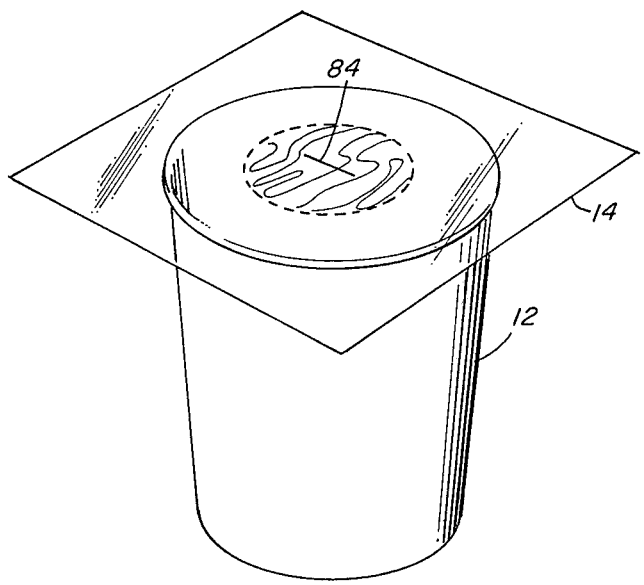
FIG. 6 is a view in perspective showing a leakproof cup made according to the invention
Figure 7:
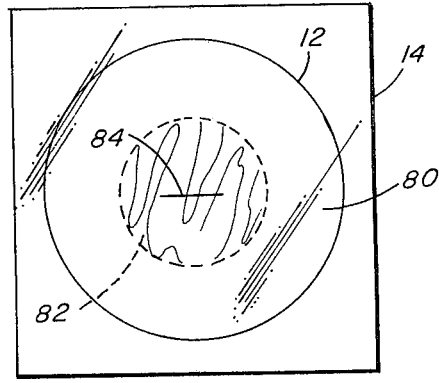
FIG. 7 is a top view thereof, and, FIGS. 8 and 9 are top plan views showing modifications of the invention.

In the FIG. 6 embodiment a circular hole 94 is formed in the center of a lid 14". The circular hole, while useful for inserting a straw in the cup, does not provide the leak-proof feature of the other film lids, although the film will be tightly sealed to the cup rim. The circular hole may be formed with a circular cutting die or punch, either cold or heated. If a hot die is used, it has been found that a bead will be formed around the edge of the opening which will inhibit tearing of the film, especially when inserting a straw. Heated elements may also be used to make holes of other shapes in the lid, such as straight or cross-shaped, for example.

While the invention has been described with particular reference to the illustrated embodiments, numerous modifications thereto will appear to those skilled in the art.

Having thus described the invention, what we claim and desire to obtain by Letters Patent of the United States is:

1. In a cup lidding apparatus having a fixed housing adapted to contain a feed roll of heat sealable film, film advance means for drawing the leading end of said film from said roll into a heat sealing horizontally extended position above a cup, cup holding means mounted below the extended film and adapted to raise said cup up into contact with the lower face of said film and then lower said cup and a heat-sealing head mounted to said housing above the extended film and opposite said cup holder and adapted to reciprocate down against the upper surface of said film to heat seal the extended film against the rim of said cup, the improvement, comprising
   (a) an annular heat sealing head formed with a central opening extending entirely through said head and presenting a flat lower annular face adapted to engage the upper surface of said film and seal the lower surface against the rim of said cup while isolating the center portion of said film from the heat of said head, and,
   (b) said head including resilient material therein,
   (c) said head including a thermally insulating member mounted in the center of said head and extending downwardly from the lower face of said head to thermally insulate the center portion of said film from said annular face.

2. Apparatus according to claim 1 including film slitting means operatively associated with said apparatus for producing a relatively short straight slit in the medial portion of said film lid.

3. Apparatus according to claim 2 wherein said film slitting means includes a knife mounted in the center portion of the annular heat-sealing head in position to slit said film upon each heat-sealing cycle of said head.

4. Apparatus according to claim 2 wherein said film slitting means includes a knife mounted adjacent the path of travel of said film and reciprocating means operatively connected thereto for forming spaced slits in said film.

* * * * *